United States Patent
Bradshaw et al.

(10) Patent No.: US 9,221,958 B2
(45) Date of Patent: Dec. 29, 2015

(54) PLASTICIZER MIXTURE OF EPOXIDIZED FATTY ACID GLYCERIN CARBONATE ESTER AND EPOXIDIZED FATTY ACID ESTERS

(71) Applicant: Ferro Corporation, Mayfield Heights, OH (US)

(72) Inventors: John D. Bradshaw, Solon, OH (US); George F. Schaefer, Strongsville, OH (US); Larry J. Baldwin, Strongsville, OH (US); Ronald J. Raleigh, Jr., Mentor, OH (US); Brenda Hollo, Broadview Heights, OH (US)

(73) Assignee: Valtris Specialty Chemicals, Independence, OH (US)

(*) Notice: Subject to any disclaimer, the term of this patent is extended or adjusted under 35 U.S.C. 154(b) by 181 days.

(21) Appl. No.: 13/974,508

(22) Filed: Aug. 23, 2013

(65) Prior Publication Data

US 2015/0057397 A1  Feb. 26, 2015

(51) Int. Cl.
 *C08K 5/1565* (2006.01)
(52) U.S. Cl.
 CPC ................ *C08K 5/1565* (2013.01)
(58) Field of Classification Search
 CPC .. C08K 5/1565; C07D 301/03; C07D 301/12; C07D 301/16
 See application file for complete search history.

(56) References Cited

U.S. PATENT DOCUMENTS

| 5,206,408 | A | 4/1993 | Liotta, Jr. |
| 7,951,766 | B1 | 5/2011 | Frenkel et al. |
| 2007/0299267 | A1 | 12/2007 | Westfechtel |
| 2008/0255373 | A1 | 10/2008 | Westfechtel |
| 2010/0010127 | A1 | 1/2010 | Barki et al. |
| 2011/0197915 | A1 | 8/2011 | Frenkel et al. |
| 2012/0085568 | A1 | 4/2012 | Eaton |

FOREIGN PATENT DOCUMENTS

| WO | 93/09111 | 5/1993 | |
| WO | 2004052874 | 6/2004 | |
| WO | WO 2015026425 A1 * | 2/2015 | ........... C08K 5/1565 |

OTHER PUBLICATIONS

Sakakura, et al., "Transformation of Carbon Dioxide", National Institute of Advanced Industrial Science and Technology (AIST), Chem Rev. 2007, 107, 2365-2387, 23 pages.
Holser, "Transesterification of Epoxidized Soybean Oil to Prepare Epoxy Methyl Esters", Industrial Crops and Products 27 (2008) 130-132, 3 pages.
Oehlenschlager, et al. "Synthesis and Mass Spectrometry of 1-Acyl and 3-Acyl-sn-Glycerol Carbonates", Lipids, vol. 13, No. 8, 1978, 557-562, 6 pages.
Glass, et al., "Dialkyl Carbonate-Induced Transesterification for Analysis of Fatty Acids in Milk", Journal of Dairy Science, 1966, 49 (12), 1469-1472, 4 pages.
Glass, et al., "Simple Method for Analysis of the Fatty Acid Composition of Milk Fats", Journal of Dairy Science, 1965, 48 (8), 1106-1109, 4 pages.
Gan, et al., Epoxidized Esters of Palm Olein as Plasticizers for Poly (Vinyl Chloride), Eur. Polym. J., 1995, vol. 31, No. 8, pp. 719-724, 6 pages.
Fabbri, et al., "Properties of a Potential Biofuel Obtained from Soybean Oil by Transmethylation with Dimethyl Carbonate", Fuel 86, 2007, 690-697, 8 pages.

* cited by examiner

*Primary Examiner* — Kriellion Sanders
(74) *Attorney, Agent, or Firm* — Black McCuskey Souers & Arbaugh, LPA

(57) ABSTRACT

A process of transesterifying biobased epoxidized vegetable oils with a dialkyl carbonate produces mixtures of epoxidized fatty acid cyclic glycerin carbonate esters and epoxidized fatty acid alkyl esters.

1 Claim, No Drawings

PLASTICIZER MIXTURE OF EPOXIDIZED FATTY ACID GLYCERIN CARBONATE ESTER AND EPOXIDIZED FATTY ACID ESTERS

BACKGROUND OF THE INVENTION

1. Field of Invention

The invention relates to plasticizers that are fully or partially sourced from renewable sources. The use of such plasticizers reduces the carbon footprint of processes that make various plastics.

2. Description of Related Art

Plasticizers are compounds or mixtures of compounds that are added to polymer resins to impart softness and flexibility. Most commercial plasticizers are sourced from fossil-based materials such as crude oil.

As taught by R. L. Glass and H. A. Troolin, dimethyl carbonate will induce transesterification of fatty acids. [R. L. Glass, Heidi A. Troolin, *Journal of Dairy Science*, 1966, 49 (12), 1469-1472.] Fatty acid ethyl, propyl, and butyl esters may be obtained in an analogous manner [R. L. Glass, Robert Jenness, Heidi A. Troolin, *Journal of Dairy Science*, 1965, 48 (8), 1106-1109.]

In WO 93/0111, Renga, et al. teach that 1:2 molar mixtures of glycerol carbonate fatty acid esters to fatty acid methyl esters can be made by transesterifying naturally occurring triglycerides. The reaction can be catalyzed by sodium methoxide. A reaction temperature of 130° C. at autogenous pressure was sustained for 11 to 24 hours in the examples. Notari, et al., teach in WO 2004/052874 that such mixtures can be useful as fuel or solvent. A reduced temperature of 90° C. and reaction time of 6 hours gave 99% conversion of soybean oil. In continuation of the teaching, Fabbri, et al. teach transesterification of vegetable oils with dimethyl carbonate (DMC) catalyzed by sodium methoxide results in a mixture of fatty acid methyl ester and cyclized fatty acid glycerin carbonate ester. Conversion is reported to be up to 99.5% after 5 hours at 90° C. Little methanol is required and no glycerol is formed as a byproduct. The pentacyclic ring is strongly favored, with little hexacyclic or non-cyclic ring formation. [Daniele Fabbri, Valerio Benvoni, Marcello Notari, and Franco Rivetti, *Fuel*, 2007, 86, 690-697.]

A continuous process for production of glycerol carbonate esters via a double transesterification is taught by Wetfechtel in US 2007/0299267 and US 2008/0255373. Triacetin is used as the source of glycerin. Glycerin carbonate acetate is formed by the transesterification of triacetin with dimethyl carbonate. A second transesterification is then carried out with linear alkyl, branched alkyl or alkenyl esters to append the corresponding group to the glycerin carbonate. Methyl acetate is a byproduct that is removed by distillation.

Fatty acid chlorides, derived from thionyl chloride and the respective fatty acid, can be used to make esters of glycerin carbonate. [J. Oehlenschläger; G. Gerchken, *Lipids*, 1978, 13, 557-562.] This method produces hydrochloric acid as a byproduct that can be scavenged with an amine. Both hydrochloric acid and amines are known to ring open epoxides. Therefore this method is unsuitable when epoxide functional groups are to be preserved.

Gan, et al. taught that palm olein could be sequentially transesterified and then epoxidized to give epoxidized esters of palm olein, which are useful as plasticizers for poly(vinyl chloride). [L. H. Gan, K. S. Ooi, S. H. Goh, L. M. Gan, and Y. C. Leong, *Eur. Polym. J.*, 1995, 31 (8), 719-724.] Epoxidation of the oleate esters was found to be essential for compatibility with the PVC.

Transesterification or alcoholysis of epoxidized vegetable oils with methanol catalyzed by sodium methoxide at 50° C. has been taught by Holser. [Ronald A. Holser, *Industrial Crops and Products*, 2008, 27, 130-132.] What is remarkable about this method is that little to no epoxide functions are ring opened as a result of this process. Glycerol is a byproduct stream of this process.

Similarly, in U.S. Pat. No. 7,951,766 and US 2011/0197915, Frenkel, et al. teach that epoxidized fatty acid esters can be made by alcoholysis of epoxidized triglycerides. The epoxidized fatty acid esters made in this way are found to be useful as bio-based cleaning solvents.

Barki, et al. teach in US 2010/0010127 that epoxidized fatty acid methyl or ethyl esters formed by alcoholysis are useful as plasticizers for PVC.

In US 2012/0085568, Eaton teaches that epoxidized fatty acid methyl ester, also known as epoxidized biodiesel, are useful as plasticizers for polymers. The method of preparation taught is to epoxidize the fatty acid methyl ester (biodiesel) using a peracid.

It would be useful in the plastics and plasticizers industries to provide biobased plasticizers to thereby reduce the carbon footprint of industrial processes.

SUMMARY

Plasticizers based on carbon from flora or fauna sources provide improved sustainability and also reduce the amount of carbon dioxide being added to the atmosphere. Flora and fauna derived raw materials that can be used to produce plasticizers include alkyl alcohols in general, epoxidized vegetable oils.

Disclosed herein is a process of reacting an epoxidized vegetable oil, preferably epoxidized soybean oil (ESO) with dialkyl carbonate (preferably dimethyl carbonate, DMC) in the presence of a metal alkoxide catalyst, preferably sodium methoxide (NaOMe). The reaction produces a mixture of epoxidized fatty acid alkyl (preferably methyl) ester and epoxidized fatty acid cyclic glycerin carbonate ester, which is believed to be a new compound. The resulting cyclic carbonate is believed to be predominantly the five-membered 1,3-dioxolan-2-one as opposed to the six-membered 1,3-dioxan-2-one.

An embodiment of the invention, Transesterification and Cyclization of Epoxidized Unsaturated Oils, is depicted in the following Reaction Scheme 1:

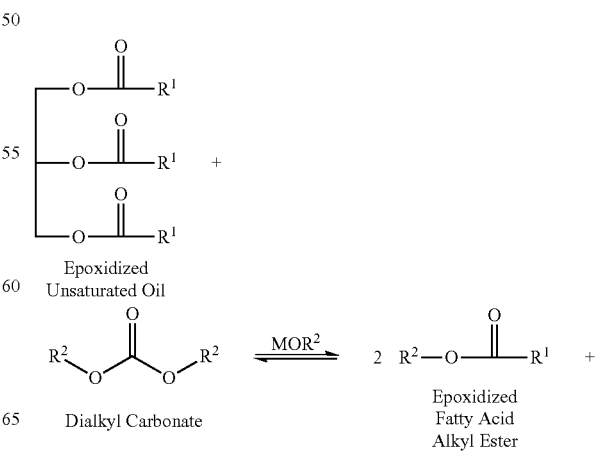

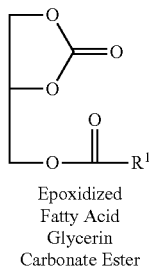

Epoxidized
Fatty Acid
Glycerin
Carbonate Ester

In the above reaction scheme, $R^1$ is represented by

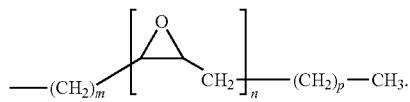

The groups $R^1$ may be the same or different as determined by the natural source of the parent oil. $R^1$ is an epoxidized $C_7$-$C_{23}$ hydrocarbon chain, wherein $1 \leq n \leq 5$ and $7 \leq (m+3n+p+1) \leq 23$. In the above reaction scheme, the groups $R^2$ may be the same or different and are selected from the group consisting of: methyl, ethyl, propyl, butyl, benzyl, or other $C_3$-$C_{12}$ alkyl group. The transesterification catalyst is represented as $MOR^2$, with M being an alkali metal of a metal alkoxide with $R^2$ having been defined above. An aprotic solvent may optionally be added to the reaction mixture.

Briefly, this embodiment is a method of transesterifying bio-sourced epoxidized vegetable oil comprising: contacting bio-sourced epoxidized vegetable oil with dialkyl carbonate in the presence of a catalyst to form a mixture of epoxidized fatty acid methyl ester and epoxidized fatty acid cyclic glycerin carbonate ester.

An alternative process, also disclosed herein, leads to similar compositions. An unsaturated vegetable oil is reacted with dialkyl carbonate and catalyzed by an alkali metal alkoxide to give a mixture of fatty acid alkyl esters and fatty acid glycerin carbonate esters. This mixture is then epoxidized, for example by the reaction of performic acid, synthesized in situ from hydrogen peroxide and formic acid. An embodiment of the invention is depicted in the following reaction schemes, which together involve Transesterification and Cyclization of Unsaturated Oils Followed by Epoxidation. An aprotic solvent may optionally be added to the reaction mixture.

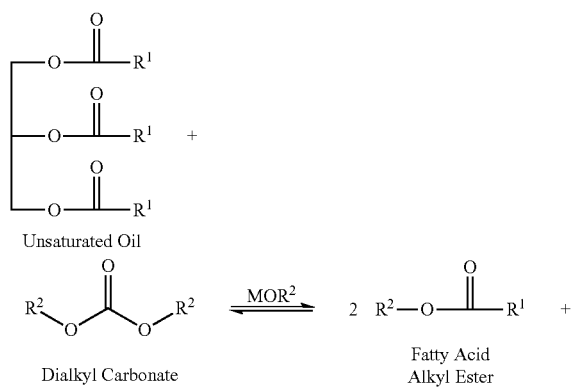

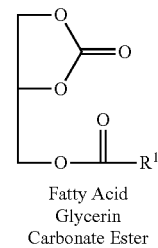

Fatty Acid
Glycerin
Carbonate Ester

In the below scheme, the $R^3$ group is epoxidized to give the $R^1$ group.

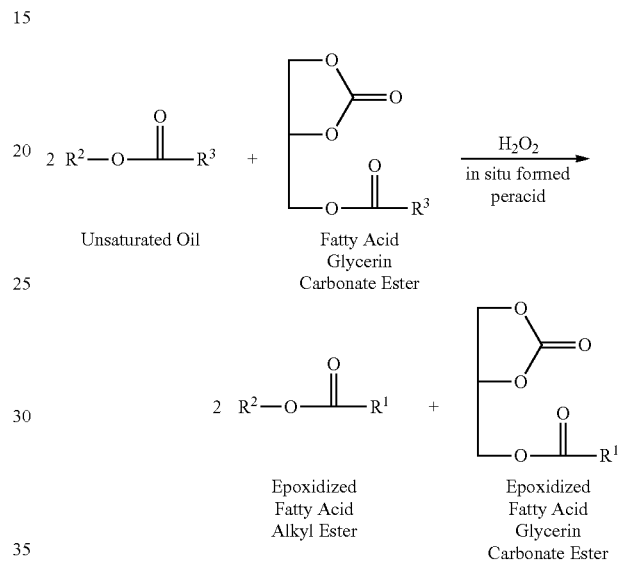

Unsaturated Oil

Fatty Acid
Glycerin
Carbonate Ester

Epoxidized
Fatty Acid
Alkyl Ester

Epoxidized
Fatty Acid
Glycerin
Carbonate Ester

In the above schemes, M, $R^1$ and $R^2$ are as described above. In the above schemes, $R^3$ is represented by

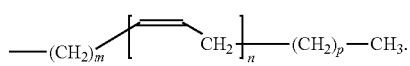

The groups $R^3$ may be the same or different as determined by the natural source of the triglyceride oil. The groups $R^3$ are $C_7$-$C_{23}$ hydrocarbon chains, wherein $1 \leq n \leq 5$ and $7 \leq (m+3n+p+1) \leq 23$.

Methanol is a toxic, volatile, flammable, but biodegradable liquid. In contrast, dimethyl carbonate (DMC) is non-toxic, non-mutagenic, yet flammable, liquid. The US EPA has named DMC an exempt compound under the definition of volatile organic compounds (VOCs). Further, DMC is a methoxycarbonylating agent at its boiling point of 90° C. It is therefore preferable to handle DMC relative to methanol.

DMC can be manufactured by oxycarbonylation of methanol, a method of sequestering $CO_2$. Sequestering $CO_2$ resulting from emissions from the combustion of renewable modern carbon sources, having relatively higher amounts of $^{14}C$, is considered to be environmentally beneficial or a "green" process. [Toshiyasu Sakakura, Jun-Chul Choi, and Hiroyuki Yasuda, *Chem. Rev.*, 2007, 107, 2365-2387.]. Arguably sequestering $CO_2$ resulting from emissions from the combustion of fossil fuels should also be beneficial to the environment. Hence, reaction products of DMC derived from $CO_2$ can be deemed "green."

Fisher-Tropsch production methanol from syngas ($CO_2$ and $H_2$) derived from biomass in place of coal is possible on a commercial scale. [S. Srinivas, Ranjan K. Malik, Sanjay M. Mahajani, *Energy for Sustainable Development*, 2007, 11 (4), 66-71.] Carbon Recycling International operates an emissions-to-liquid renewable methanol plant in Iceland. At present most methanol produced in the United States is derived from natural gas. Hence it is likely that the methanol used to produce DMC is derived from natural gas at present.

Ethanol is now widely produced by fermentation of sugar cane and corn for the use in automotive fuels. INEOS produces "cellulosic" ethanol by fermenting syngas from wood and vegetable biomass. The use of "bioethanol" is considered to be a "green" process.

Vegetable oils are renewable raw materials. The process envisioned herein utilizes vegetable oils as the predominant contributor to mass of the products; therefore, the process envisioned herein is "green" or "bio-sourced."

Components of the plasticizer mixtures made by the methods of the invention can be combined with unconverted epoxidized vegetable oils. The unconverted epoxidized vegetable oils can be present in the mixture at the beginning of the reaction as excess reagents or can be added later. If added later, the epoxidized vegetable oils can be other than the starting material for the principal mixture of epoxidized fatty acid alkyl ester and epoxy glycerin carbonate ester. In various embodiments of the invention, the starting epoxidized vegetable oils can be: epoxidized soybean oil, epoxidized linseed oil, epoxidized canola oil, epoxidized tall oil, and others.

Components of the plasticizer mixture may be further extended to include: epoxidized octyl tallate, epoxidized tetra-esters of pentaerythritol, dibenzoate esters, 1,2-cyclohexane dicarboxylate esters, terephthalate esters, ortho-phthalate esters, phosphate esters, succinate esters, adipate esters, citrate esters, and others.

An embodiment of the invention is a method of transesterifying bio-sourced epoxidized vegetable oil comprising: contacting epoxidized vegetable oil with dimethyl carbonate in the presence of an alkali metal methoxide or ethoxide to form a mixture of epoxidized fatty acid methyl ester and epoxidized fatty acid cyclic glycerin carbonate ester.

An embodiment of the invention is a method of epoxidizing a mixture of fatty acid cyclic glycerin carbonate and fatty acid alkyl ester.

An embodiment of the invention is an epoxidized fatty acid cyclic glycerin carbonate ester having the formula:

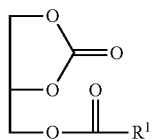

wherein $R^1$ is represented by

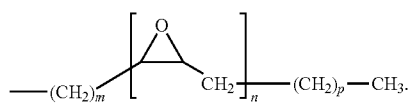

$R^1$ is an epoxidized $C_7$-$C_{23}$ hydrocarbon chain, wherein $1 \leq n \leq 5$ and $7 \leq (m+3n+p+1) \leq 23$. Typically 1, 2, or 3 epoxidized unsaturations are naturally found, but up to 5 might be found on the chain. The five-membered cyclic carbonate is thought to be the predominant form of the product. The group members $R^1$ may be the same or different as determined by the natural source of the oil.

The epoxidized fatty acid glycerin carbonate ester plasticizers made with bio-derived raw materials constitute a significant improvement in sustainable industrial processes because the resource can be completely from renewable sources and no glycerin byproduct stream is generated. These plasticizers made with bio-derived raw materials would also constitute a significant reduction in manmade carbon dioxide released into the biosphere.

The process depicted in Reaction Scheme 1 by which the products of this invention are made can be a batch process or a continuous process. Current transesterification processes producing epoxidized fatty acid methyl esters require phase separation of a glycerin byproduct. The process of this invention does not produce a glycerin byproduct stream nor other major byproducts. Hence, the benefit gained through this process is that phase separation of the glycerin is not necessary.

The invention further relates to processes of making plasticized thermoplastic polymers including the addition of any plasticizer herein to a thermoplastic polymer. Plasticizers of the invention with halogenated thermoplastic polymers represent preferred embodiments of the invention.

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

DETAILED DESCRIPTION OF THE INVENTION

The compounds of the invention are used to soften thermoplastic polymer resins that would otherwise be brittle and inappropriate for many applications. Plasticizers improve flexibility and tensile strength in such resins.

Bioderived sources of starting materials for esterification reactions to make the plasticizers of interest can come from a number of sources. Ethanol can be derived from biomass through fermentation of sugars or starch. Biomass can be used as a source for producing carbon monoxide and hydrogen gases which mixture is also known as syngas. The production of many chemicals including alkyl alcohols is currently accomplished from syngas and appropriate catalyst systems.

Epoxidized fatty acid methyl esters can be formed by transesterification of epoxidized vegetable oils with methanol catalyzed by sodium methoxide. The transesterification is complete in 10 minutes at 50° C. without loss of the epoxide function. This produces a byproduct stream of glycerin.

Vegetable oils can be converted to a mixture of fatty acid methyl esters and fatty acid glycerin carbonate esters via reaction catalyzed by sodium methoxide. Greater than 99.5% conversion results after 5 hours at 90° C. using 5% catalyst. Cyclization to form the 2-oxo-1,3-dioxolan cyclic ring is strongly favored, with little hexacyclic or non-cyclic ring formation. The principal byproducts are triglycerides (0.20%), diglycerides (0.17%), glycerol carbonate (0.07%), and glycerol dicarbonate (0.4%).

An embodiment of the invention is a plastic mass or article including any plasticizer disclosed herein or made by a process disclosed herein. The transesterified bio-sourced epoxidized vegetable oils of the invention are plasticizers.

An embodiment of the invention is a method of transesterifying bio-sourced epoxidized vegetable oil comprising: contacting bio-sourced epoxidized vegetable oil with dimethyl carbonate in the presence of a catalyst to form a mixture of epoxidized fatty acid methyl ester and epoxidized fatty acid glycerin carbonate ester. The alkoxide-containing compound is selected from the group consisting of sodium methoxide and sodium ethoxide.

A small amount of alkoxide containing compound may be included with the starting reagents, as a catalyst, for example less than 20 mol %, less than 10 mol %, less than 5 mol %, less than 4 mol %, less than 3 mol %, less than 2 mol % or less than 1 mol %, relative to starting moles of bio-sourced epoxidized vegetable oil.

In the methods of the invention, glycerin as a byproduct is produced in low amounts, for example less than 10 mol %, less than 5 mol %, less than 4 mol %, less than 3 mol %, less than 2 mol % or less than 1 mol %, relative to starting moles of bio-sourced epoxidized vegetable oil.

A generalized structure for epoxidized fatty acid esters is:

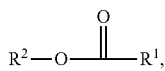

wherein $R^1$ is represented by

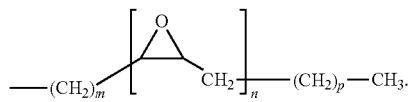

$R^1$ is an epoxidized $C_7$-$C_{23}$ hydrocarbon chain, wherein $1 \leq n \leq 5$ and $7 \leq (m+3n+p+1) \leq 23$. Typically 1, 2, or 3 epoxidized unsaturations are naturally found, but up to 5 might be found. The five-membered cyclic carbonate is thought to be the predominant form of the product. The group members $R^1$ may be the same or different as determined by the natural source of the oil. The groups $R^2$ may be the same or different and are selected from the group consisting of: methyl, ethyl, propyl, butyl, benzyl, or other $C_3$-$C_{12}$ alkyl group.

The structure of epoxidized glycerin carbonate fatty acid esters incorporates the cyclic carbonate ring and is similar to that above:

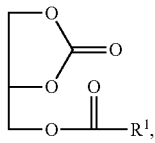

wherein $R^1$ is represented by

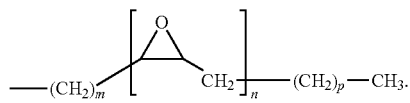

$R^1$ is an epoxidized $C_7$-$C_{23}$ hydrocarbon chain, wherein $1 \leq n \leq 5$ and $7 \leq (m+3n+p+1) \leq 23$. Typically 1, 2, or 3 epoxidized unsaturations are naturally found, but up to 5 might be found. The five-membered cyclic carbonate is thought to be the predominant form of the product. The structure of the epoxidized glycerin carbonate fatty acid ester is a mixture with group members of $R^1$ being the same or different as determined by the natural source of the oil.

An embodiment of the invention is a method of transesterifying bio-sourced unsaturated vegetable oil comprising: (a) contacting bio-sourced unsaturated vegetable oil with dialkyl carbonate in the presence of a catalyst to form a mixture of fatty acid alkyl ester and fatty acid glycerin carbonate ester, and (b) epoxidizing the mixture of fatty acid alkyl ester and fatty acid glycerin carbonate ester. An aprotic solvent may optionally be added to the reaction mixture.

Set forth below are representative components contemplated by the invention. The following lists are exemplary and without limitation.

Suitable epoxidized vegetable oils include but are not limited to the epoxidized forms of: soybean oil, high oleic soybean oil, linseed oil, sunflower oil, high oleic sunflower oil, rapeseed oil (Canola), tall oil, corn oil, and palm olein.

Suitable dialkyl carbonates include but are not limited to: dimethyl carbonate [CAS No. 616-38-6], ethyl methyl carbonate [CAS No. 623-53-0], diethyl carbonate [CAS No. 105-58-8], dipropyl carbonate [CAS No. 623-96-1], diisopropyl carbonate [CAS No. 6482-34-4], diallyl carbonate [CAS No. 15022-08-9], butyl propyl carbonate [CAS No. 35466-84-3], dibutyl carbonate [CAS No. 542-52-9], di-t-butyl carbonate [CAS No. 24424-99-5], t-butyl cyclohexyl carbonate [CAS No. 21690-93-7], and dibenzyl carbonate [CAS No. 3459-92-5]. Other dialkyl carbonates derived from linear, branched, and cyclic alcohols containing 1 to 12 carbons are suitable. Liotta teaches in U.S. Pat. No. 5,206,408 the synthesis of unsymmetrical carbonates. By that method, mixtures of $R^2$ groups of the dialkyl carbonates employed in the method of this invention can be foreseen. For the purpose of synthesizing compounds of this invention, the starting carbonate should be non-cyclic and derived from mono-protic alcohols. Mixed dialkyl carbonates, e.g. ethyl methyl carbonate, will give corresponding mixed transesterified esters. Preference may be given to those dialkyl carbonates that are derived from renewable sources.

The catalyst for the transesterification can be an alkali metal alkoxide, with the alkoxide preferably matching the alkyl group of the dialkyl carbonate employed, e.g. sodium methoxide and dimethyl carbonate being used together. Li, Na, and K alkali metal alkoxides are suitable catalysts. Other catalysts that might be suitable include: basic cesium compounds such as cesium carbonate and cesium oxide, dibutyltin oxide, dibutyltin dilaurate, tin(II) bis-2-ethylhexanoate, zinc 2-ethylhexanoate, titanium alkoxides, and others. Sodium methoxide is most preferred.

Suitable aprotic solvents that can optionally be employed include but are not limited to: tetrahydrofuran, 2-methyltetrahydrofuran, t-butylmethylether, 1,2-dimethoxyethane, diethylene glycol dimethyl ether, and diethylene glycol dibutyl ether. Metal alkoxides have been found to have limited solubility in vegetable oils and in epoxidized vegetable oils. Advantage has been found in that the aprotic solvent better suspends the metal alkoxide in the reaction mixtures of the invention.

Figure 1 shows the generalized reaction scheme of transesterifying bio-sourced epoxidized vegetable oil to form mixture of epoxidized fatty acid alkyl ester and epoxidized fatty acid cyclic glycerin carbonate ester.

An embodiment of the invention is a method of transesterifying bio-sourced epoxidized vegetable oil comprising: contacting epoxidized vegetable oil with dimethyl carbonate in the presence of an alkali metal methoxide or ethoxide to form a mixture of epoxidized fatty acid methyl ester and epoxidized fatty acid cyclic glycerin carbonate ester.

An embodiment of the invention is a plastic mass or plastic article including any plasticizer made by any method disclosed herein.
The invention claimed is:
1. Epoxidized fatty acid cyclic glycerin carbonate ester having the formula
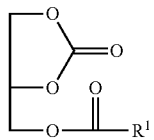
wherein $R^1$ is an epoxidized $C_7$-$C_{23}$ hydrocarbon chain, represented by
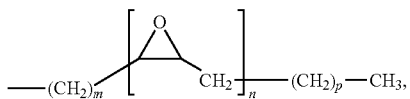
wherein $1 \leq n \leq 5$ and $8 \leq (m+3n+p+1) \leq 23$.
* * * * *